United States Patent
Verdu et al.

(10) Patent No.: US 7,420,487 B2
(45) Date of Patent: Sep. 2, 2008

(54) DENOISING VIDEO

(75) Inventors: Sergio Verdu, Princeton, NJ (US);
Marcelo Weinberger, San Jose, CA (US); Itschak Weissman, Menlo Park, CA (US); Erik Ordentlich, San Jose, CA (US); Gadiel Seroussi, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 119 days.

(21) Appl. No.: 11/580,611

(22) Filed: Oct. 12, 2006

(65) Prior Publication Data
US 2007/0030900 A1     Feb. 8, 2007

Related U.S. Application Data

(63) Continuation-in-part of application No. 11/180,066, filed on Jul. 12, 2005, now Pat. No. 7,271,749.

(60) Provisional application No. 60/611,169, filed on Sep. 14, 2004.

(51) Int. Cl.
*H03M 7/00* (2006.01)
(52) U.S. Cl. .......................... 341/107; 341/51; 341/55; 375/346; 375/240.13; 382/261
(58) Field of Classification Search ................ 341/51, 341/55, 107; 375/240.12, 240.13; 382/232, 382/261
See application file for complete search history.

(56) References Cited

U.S. PATENT DOCUMENTS

| | | | | |
|---|---|---|---|---|
| 5,737,022 A * | 4/1998 | Yamaguchi et al. | ..... | 375/240.15 |
| 5,768,533 A * | 6/1998 | Ran | ..... | 709/247 |
| 6,259,736 B1 * | 7/2001 | Chujoh et al. | ..... | 375/240.13 |
| 6,304,295 B1 * | 10/2001 | Krishnamurthy et al. | .. | 348/420.1 |
| 6,700,933 B1 * | 3/2004 | Wu et al. | ..... | 375/240.16 |
| 7,072,398 B2 * | 7/2006 | Ma | ..... | 375/240.16 |
| 7,271,747 B2 * | 9/2007 | Baraniuk et al. | ..... | 341/87 |
| 2003/0086623 A1 * | 5/2003 | Berkner et al. | ..... | 382/260 |
| 2004/0071363 A1 * | 4/2004 | Kouri et al. | ..... | 382/276 |
| 2005/0131660 A1 * | 6/2005 | Yadegar et al. | ..... | 703/2 |
| 2005/0135700 A1 * | 6/2005 | Anderson | ..... | 382/261 |
| 2006/0045360 A1 * | 3/2006 | Weissman et al. | ..... | 382/232 |
| 2007/0081587 A1 * | 4/2007 | Raveendran et al. | ..... | 375/240.1 |

OTHER PUBLICATIONS

Weissman, Tsachy et al., "Universal Discrete Denoising: Known Channel" IEEE Transactions on Information Theory, vol. 51, No. 1 (2005) pp. 5-28.

* cited by examiner

*Primary Examiner*—Linh V Nguyen

(57) ABSTRACT

A denoising process statistically processes a series of frames of a motion picture to construct respective data structures for the frames. Each data structure indicates for each of multiple contexts, occurrences of symbols that have the same context and are in the corresponding one of the frames. The data structures for multiple frames are combined to construct an enhanced data structure for one of the frames, and symbols in that frame are replaced with values determined using the enhanced data structure.

23 Claims, 4 Drawing Sheets

DENOISING VIDEO

CROSS-REFERENCE TO RELATED APPLICATIONS

This patent document is a continuation-in-part and claims benefit of the earlier filing date of U.S. patent application Ser. No. 11/180,066, entitled "Context-Based Denoiser that Simultaneously Updates Probabilities for Multiple Contexts," filed Jul. 12, 2005 now U.S. Pat. No. 7,271,749, which claims the priority U.S. Provisional Pat. App. No. 60/611, 169, entitled "Universal Denoiser for Continuous Tone Images," filed Sep. 14, 2004.

BACKGROUND

Motion pictures on celluloid or magnetic storage media (e.g., VHS tapes) are subject to scratches, dust, speckling, and other sources of "noise." Noise can also appear in motion pictures during transmission through a noisy channel and in general, sources of noise such as storage errors, transmission errors, and reproduction errors can all be treated as the effects of a noisy channel. During viewing of the motion pictures, the noise often appears as static or as superposed pixels of the wrong color, e.g., black or white specs. While motion pictures containing noise may still be viewable, it is desirable to rid the motion pictures of these artifacts in many applications and in particular in consumer products that transfer motion pictures from analog media to digital media such as DVDs.

The process for removing noise from data or a signal is generally referred to as denoising, and a number of denoising schemes and filters have been developed The goal of most denoising processes is to convert a noisy signal $S_N$ into a recovered signal $S_R$ that is "closer" to the original clean signal $S_C$. Since the clean signal $S_C$ is unavailable during denoising, a denoising process may use a priori knowledge of characteristics of the clean signal $S_C$ and/or attempt to infer the characteristics of the clean signal $S_C$ from analysis of the noisy signal $S_N$. A universal denoising process in general operates with little or no a priori knowledge of the characteristics of the clean signal $S_C$.

Discrete Universal DEnoising, sometimes referred to herein as DUDE, is a type of universal denoising that can be applied to a noisy signal $S_N$ containing discrete symbols $s_i$ from a known alphabet $A=\{a_1, a_2, \ldots a_n\}$. DUDE uses a context $\eta(s)$ of each symbol s being denoised, where the context $\eta(s)$ in general is a set of symbols that in some sense neighbor the symbol s. For example, a signal representing a grayscale image and containing symbols that are pixel values may have an alphabet that is the set of values from 0 to 255, and each symbol corresponding to a pixel away from the edge of an image may have a context defined to be the pixel values for the nearest pixels in the image.

DUDE generally includes a modeling scan and a denoising scan of the noisy signal $S_N$. The modeling scan determines count vectors $m(\eta)$ (or equivalent probability vectors) for respective contexts $\eta$. Each component $m(\eta)_{[i]}$ of a count vector $m(\eta)$ indicates the number of times a corresponding symbol $a_i$ is found in context $\eta$ in the noisy signal $S_N$. Related count vectors $q(\eta)$ containing counts of symbols in the clean signal $S_C$ that end up in neighborhoods $\eta$ in the noisy signal $S_N$ indicate statistical characteristics of the clean signal $S_C$. Lacking the clean signal $S_C$, DUDE cannot directly determine the count vectors $q(\eta)$, but DUDE can estimate count vectors $q(\eta)$, for example, through matrix multiplication of measured count vector $m(\eta)$ by the inverse of a channel matrix $\Pi$, e.g., $q(\eta) \approx \Pi^{-1} m(\eta)$. The channel matrix $\Pi$ can be determined or estimated based on knowledge of the source or type of targeted noise.

The denoising scan generates recovered signal $S_R$ by replacing each occurrence of a symbol $a_j$ found in context $\eta$ in the noisy signal $S_N$ with a symbol $a_i$ that minimizes an estimate of the distortion that results from replacing symbol $a_j$ with symbol $a_i$ in the clean signal $S_C$. (Symbols $a_j$ and $a_i$ may be equal, which is equivalent to leaving $a_j$ unchanged when found in context $\eta$.) Equation 1 indicates a distortion estimate $D(a_j, a_i, \eta)$ suitable for the DUDE process. In Equation 1, vector $\lambda(a_i)$ is a column of a symbol transformation matrix $\Lambda$, and each component of vector $\lambda(a_i)$ indicates a measure of the distortion created in clean signal $S_C$ by replacing the symbol corresponding to that component with symbol $a_i$. Vector $\pi(a_j)$ is a column of channel matrix $\Pi$ and has components indicating the probability of the channel (i.e., the source of targeted noise) replacing a corresponding symbol with symbol $a_j$, and the Schur product $\lambda(a_i) \odot \pi(a_j)$ generates a vector having components equal to the products of corresponding components of vectors $\lambda(a_i)$ and $\pi(a_j)$.

$$D(a_j, a_i, \eta) = q^T(\eta)(\lambda(a_i) \odot \pi(a_j)) \approx m^T(\eta) \Pi^{-1}(\lambda(a_i) \odot \pi(a_j))$$

Equation 1:

Obtaining optimal performance from DUDE generally requires a signal of sufficient length (i.e., a sufficiently large data set) to provide good statistics in the determination of measured count vectors $m(\eta)$. However, when the alphabet A is large and/or the number of symbols in each context $\eta$ is large, for example, in grayscale or color images, the available data may be insufficient to provide reliable statistics for the measured count vectors $m(\eta)$.

SUMMARY

In accordance with an aspect of the invention, a denoising process statistically processes a series of frames of a motion picture to construct respective data structures for the frames, e.g., count vectors. Each data structure indicates for a corresponding context, occurrences of symbols that have the context and are in the corresponding one of the frames. The data structures for multiple frames are combined to construct an enhanced data structure for one of the frames, and symbols in that frame are replaced with values determined using the enhanced data structure.

BRIEF DESCRIPTION OF THE DRAWINGS

Use of the same reference symbols in different figures indicates similar or identical items.

DETAILED DESCRIPTION

In accordance with an aspect of the invention, denoising systems and methods effectively exploit redundancies in the successive images or frames of a motion picture to achieve superior performance. To that end, a denoising process can use a series of frames of a motion picture during modeling of each frame, instead of independently denoising each frame. Through aggregated processing of multiple frames, the modeling scan can recognize and replace pixel values that are not only unlikely given their context within the current frame but also unlikely within similar contexts in previous and successive frames. In particular, count vectors or other data structures that indicate count vectors can be built using a succession of frames. The effect accomplished is similar to that achieved by motion compensation in video compression (e.g., in the MPEG standard), with the advantage that denoising does not require determination of motion vectors. Instead, symbol replacement decisions are based on the statistics of pixel values occurring in similar contexts in a series of frames, without dependence on the precise locations of the contexts in the frames.

Motion compensation could be used to enhance the denoising process by adding motion-compensated samples from neighboring frames to the information used to identify similar contexts for the statistics used in the current frame. For example, a pixel from a neighboring frame determined through motion compensation to correspond to the current pixel being denoised, is likely to be highly correlated with the current pixel, and thus significant as part of the conditioning context.

Forgetting factors can compensate for changes in the statistics that eventually occur in a video sequence, for example, during panning, zooming, scene activity, or other "continuous" scene changes. The forgetting factors tend to diminish the statistical influence of frames having greater separations in time from the denoising decisions in a current frame, leaving more weight to the statistics of frames that are temporally closer to the frame currently being denoised. In addition to the gradual forgetting mechanism that addresses scene evolution, abrupt scene transitions can be detected using conventional methods used in digital video processing and can trigger a complete reset of context statistics and/or other parameters of the denoising process.

Figure 1:
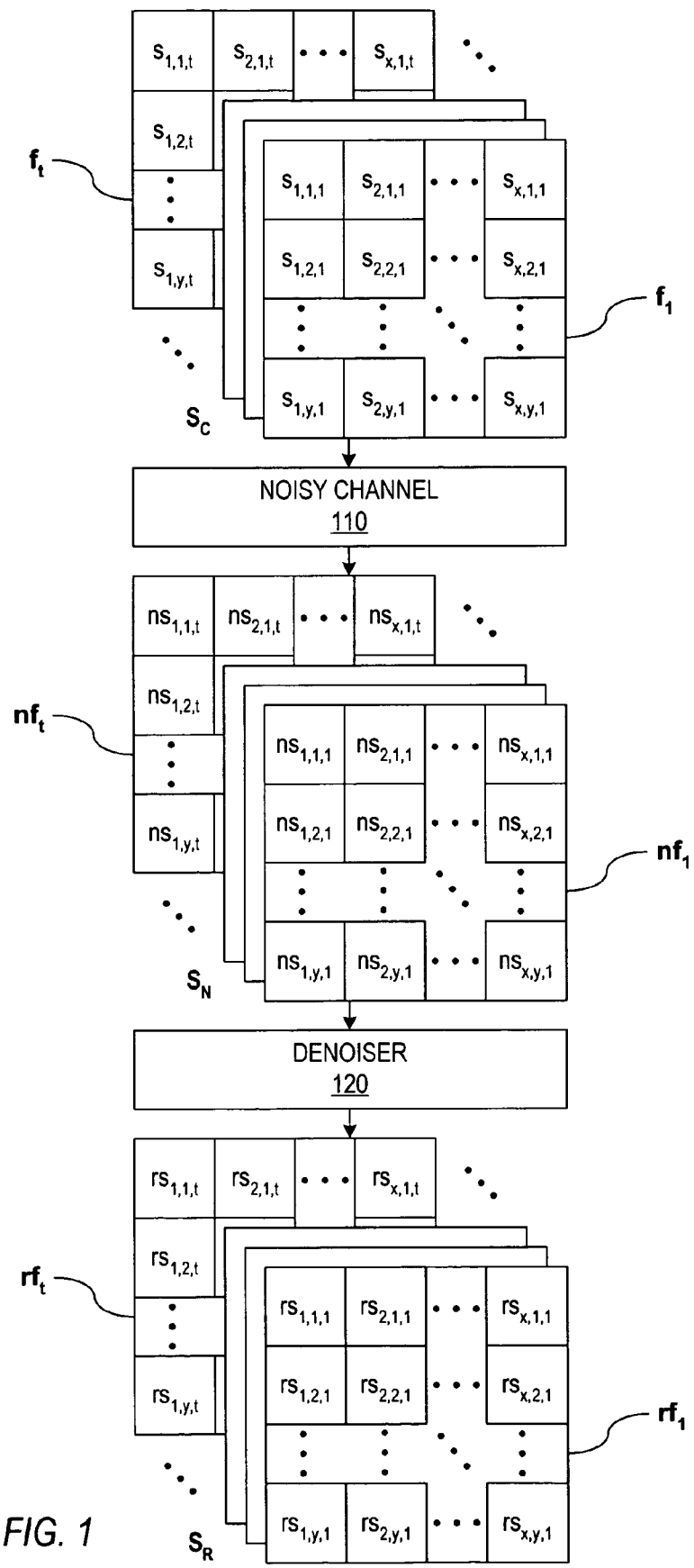
FIG. 1 illustrates denoising of a motion picture.

FIG. 1 illustrates a denoising process for a motion picture. In FIG. 1, a clean signal $S_C$ represents an uncompressed digitized motion picture made up of a series of clean frames $f_1$ to $f_t$. Each frame $f_k$ for frame index k between 1 and t corresponds to an image represented by a two-dimension array of pixel values $s_{i,j,k}$, where i and j are indices identifying the horizontal and vertical positions of the pixels in the image. Each pixel value $s_{i,j,k}$ is from an alphabet that depends on the method used for representing the images in the motion picture. For grayscale video, for example, each pixel value $s_{i,j,k}$ represents the intensity of a corresponding pixel in the frame/image and can be an integer in a specific range, e.g., from 0 to 255 for 8-bit pixel values. For color video, each pixel value $S_{i,j,k}$ represents a color of a corresponding pixel and may be a triplet of digital values, e.g., three components of a color representation such as the Red-Green-Blue (RGB) model or a luminance-chrominance model (e.g., YCbCr). Alternatively, each pixel value $s_{i,j,k}$ may represent only a single color component when one or more color components of color video are separately denoised. For example, pixel values $s_{i,j,k}$ may have digital values from 0 to 255 representing the luminance level Y, and the chrominance components of the motion picture may be separately denoised or not depending on the desired result.

The following concentrates on an illustrative example of a denoising process where each pixel value $s_{i,j,k}$ in clean signal $S_C$ is an 8-bit value corresponding to a grayscale level of a black-and-white motion picture or a luminance of a color motion picture. From the description of the illustrative example, variations required for applications to motion pictures using other video representations will be apparent to those of skill in the art.

Noisy signal $S_N$ is the signal that is actually available for processing. Noisy signal $S_N$ may be produced, for example, by digitization of an analog signal, decompression and/or decoding of compressed video, and/or received via transmission. Noisy signal $S_N$ contains a series of frames $nf_1$ to $nf_t$, and each frame $nf_k$ corresponds to an image represented by a two-dimension array of pixel values $ns_{i,j,k}$, where k is a frame index and i and j are indices identifying the position of the corresponding pixels in the frame or image. Each pixel value $ns_{i,j,k}$ is assumed here (but is not required) to be from the same alphabet as the clean pixel values $s_{i,j,k}$.

A channel 110 introduces noise, so that symbols/noisy pixel values $ns_{i,j,k}$ of noisy signal $S_N$ may differ from respective clean symbols/pixel values $s_{i,j,k}$ of clean signal $S_C$. Noisy channel 110 represents all sources of noise that are targeted for removal and is not limited to representing transmission errors. In particular, noisy channel 110 may also represent mechanisms for introducing data degradation in a storage medium such as celluloid or magnetic media, reading errors, decoding artifacts, and digitization errors.

A denoiser 120 performs a denoising process that attempts to remove noise from noisy signal $S_N$. Denoiser 120 may be implemented in software or firmware that is stored on a computer readable media and executed by a general purpose computer, may be implemented using application specific hardware, or may be implemented using a combination of software and hardware.

Figure 2:
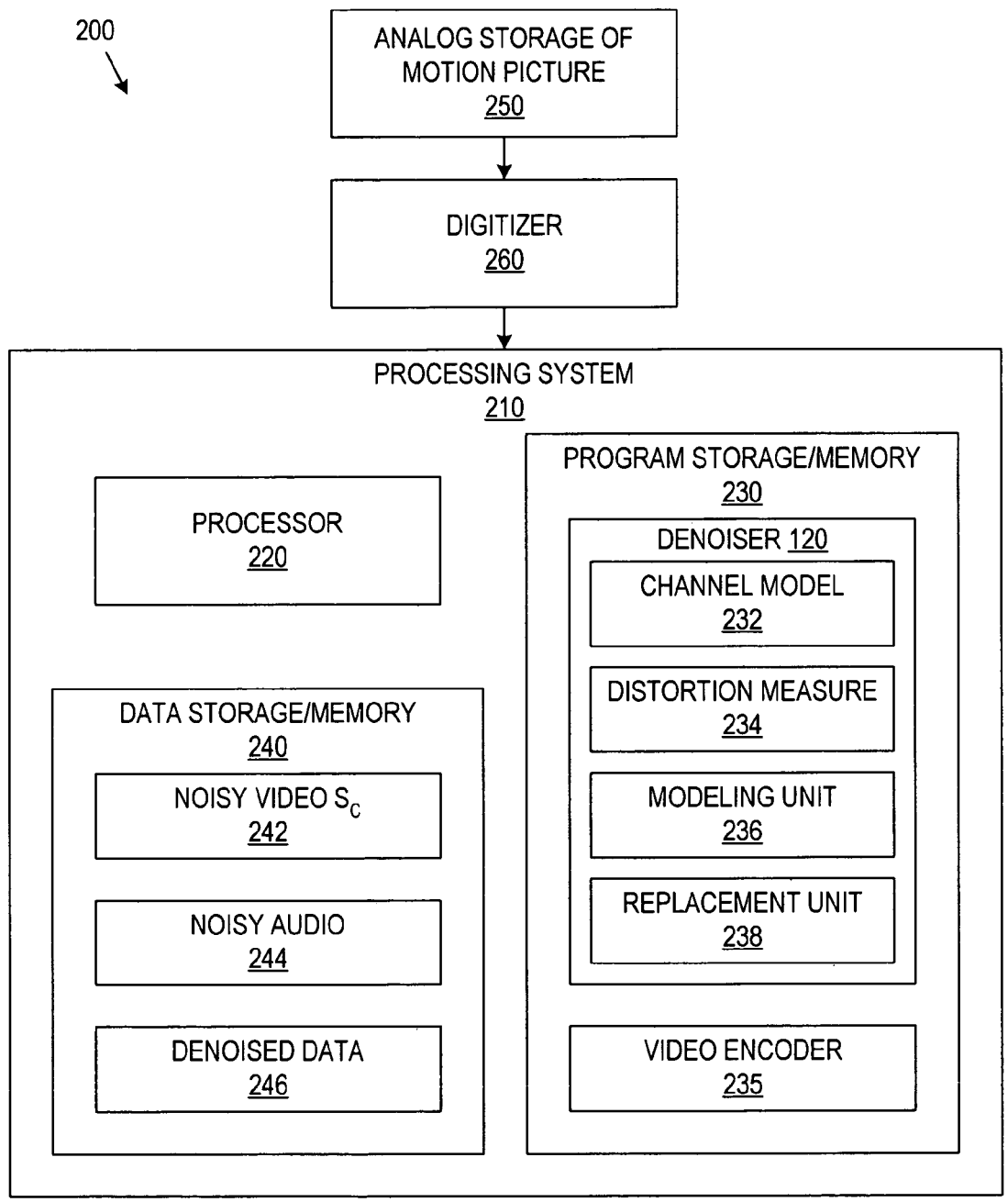
FIG. 2 illustrates a system for denoising a motion picture in accordance with an embodiment of the invention using a general purpose computer to remove noise from analog sources.

FIG. 2 illustrates a system 200 in accordance with an embodiment of the invention in which denoiser 120 is implemented in software executed in a processing system 210 by a processor 220. Processing system 210 can be a general purpose computer having memory and data storage that may be implemented using conventional components such as DRAM, SRAM, Flash memory, or other IC memory, disk storage such as hard drives, CD-ROM, or DVD ROM, or any other medium capable of storing computer readable instructions. The memory/storage of processing system 210 of FIG. 2 is divided into program storage/memory 230 containing programs or routines implementing denoiser 120 and a video encoder 230 and data storage/memory 240 containing noisy video 242 (i.e., noisy signal $S_C$) with associated noisy audio 244 and denoised data 246. Denoised data 246 can include both audio data (denoised or not) and denoised image data and may be encoded/compressed by video encoder 235 after or as denoiser 120 generates the denoised video data.

An analog storage system 250 such as celluloid film or magnetic tape stores a version of the motion picture to be denoised. In general, the motion picture stored in analog storage 250 will not be the clean motion picture because the original transfer or creation of the motion picture on analog storage 250 may introduce errors and because analog storage is generally subject to damage and degradation. A digitizer 260 converts the motion picture from analog storage 250 into noisy signal $S_N$ and may be another source of the noise in noisy signal $S_N$. Analog storage 250 and digitizer 260 are illustrated here merely as examples of sources of noise that can be modeled by noisy channel 110 of FIG. 1.

The noise that denoiser 120 removes from noisy signal $S_N$ depends on a channel model 232 that denoiser 120 uses for noisy channel 110. Denoiser 120 can, for example, select channel model 232 for removal of one or more particular types of noise such as impulse noise or Gaussian noise. In such cases, the "clean" signal $S_C$ may be thought of as containing noise that is either acceptable or not currently targeted for removal. For general noise removal, denoiser 120 can select channel model 232 according to a priori knowledge of noisy channel 110 (e.g., knowledge of the source of the noise) or can include in channel model 232 parameters that are adjustable to adapt to user preferences or according to measurements characterizing noisy channel 110.

In the exemplary embodiment, channel model 232 is based on a channel matrix Π having columns $\pi(a_j)$ corresponding to respective symbols $a_j$ in the alphabet of clean signal $S_C$. Each column $\pi(a_j)$ contains one component for each symbol in the alphabet for noisy signal $S_N$, and each component in each column $\pi(a_j)$ indicates the probability that noisy channel 110 will replace a symbol corresponding to that component with the symbol $a_j$. This type of channel model corresponds to the noise that only depends on a single symbol in clean symbol $S_C$ and not on the values of a group of symbols. Such channel models can be developed by observing the effect of noisy channel 110 on a known clean signal.

Denoiser 120 generates a recovered signal $S_R$ of FIG. 1 from noisy signal $S_N$. Recovered signal $S_R$ contains a series of frames $rf_1$ to $rf_t$, and each frame $rf_k$ corresponds to an image represented by a two-dimension array of pixel values $rs_{i,j,k}$, where k is a frame index and i and j are indices identifying the position of the corresponding pixels in the frame or image. Recovered signal $S_R$ is closer to clean signal $S_C$ than is noisy signal $S_N$ in a sense defined by a distortion model or measure. Denoiser 120 of FIG. 2 uses a distortion measure 234 to model the effect of noise. In the exemplary embodiment, the distortion measure 234 is defined by a symbol transformation matrix Λ having one column $\lambda(a_k)$ for each symbol $a_k$ in the alphabet of clean signal $S_C$. Each column $\lambda(a_k)$ contains one component for each symbol in the alphabet of clean signal $S_C$, and each component in the column $\lambda(a_k)$ indicates the relative distortion that results from replacing a symbol corresponding to that component with the symbol $a_k$.

Figure 3:
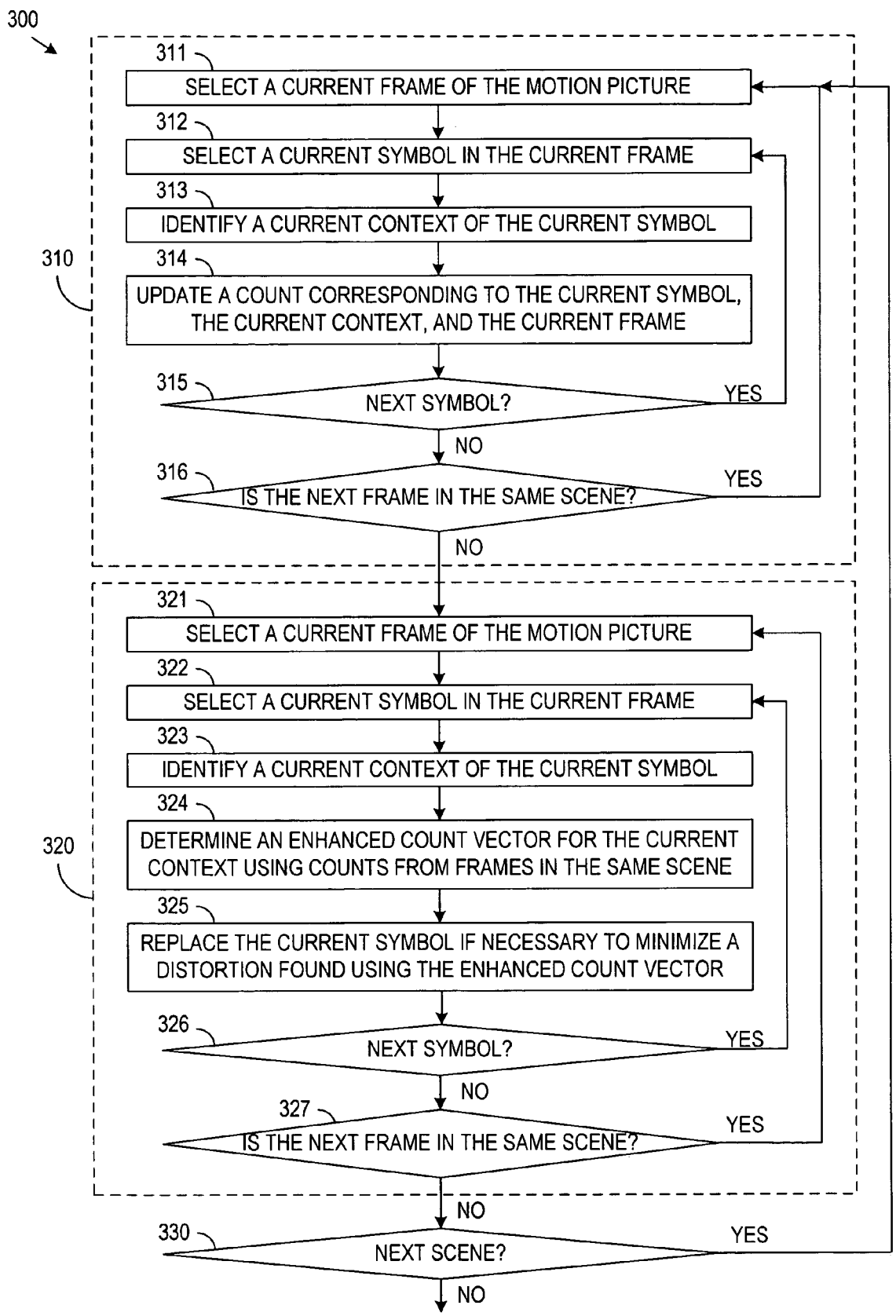
FIG. 3 is a flow diagram of a denoising process in accordance with an embodiment of the invention that uses statistical information from multiple frames.

FIG. 3 is a flow diagram of a denoising process 300 that denoiser 120 of FIG. 2 can use to generate recovered signal $S_R$ from noisy signal $S_N$. In particular, denoising process 300 includes a modeling pass 310 and a replacement pass 320 that may be implemented by a modeling unit 236 and a replacement unit 238 in denoiser 120 of FIG. 2.

Modeling pass 310 and replacement pass 320 in the embodiment of FIG. 3 are performed for each scene of a motion picture. In particular, modeling pass 310 processes noisy frames $nf_k$ corresponding to a current scene of a motion picture to construct respective data structures statistically characterizing appearances of symbols in contexts. Replacement pass 320 then performs symbol replacements in the frames of the current scene and for each symbol in a frame $nf_k$, decides whether to replace the symbol based on the statistical data structures for multiple frames in the current scene.

Modeling pass 310 as illustrated includes steps 311 to 316. Step 311 selects a current frame $nf_k$ of the motion picture and initially selects the first frame of a current scene in the motion picture being denoised. The current scene will generally include multiple frames that have correlated content arising from evolution of images in the motion picture. Each scene will in general begin and end with a transition where the two frames (one of which is in the scene) have contents with low correlation.

Step 312 selects a current symbol $ns_{i,j,k}$ in the current frame $nf_k$, and step 313 identifies a current context $\eta(ns_{i,j,k})$ of the current symbol $ns_{i,j,k}$. As described further below, the contexts of symbols are used in statistical evaluation of motion pictures to identify when a particular symbol value is rarely found in a particular context and may therefore be noise.

Figure 4A:
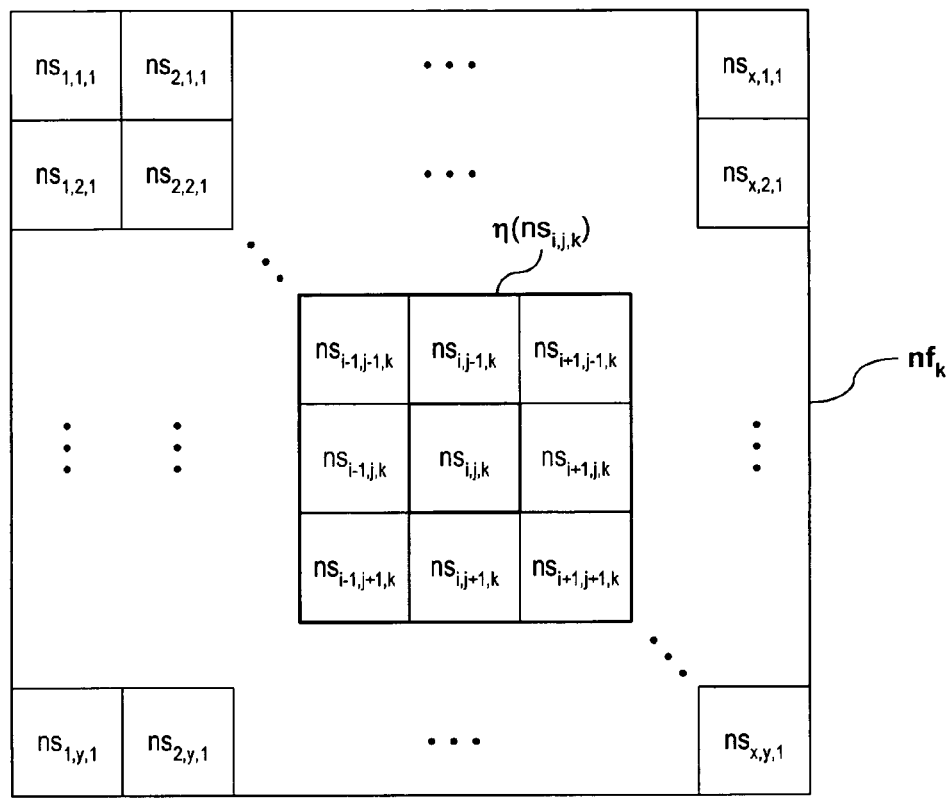
FIGS. 4A and 4B illustrate alternative methods for identifying the neighborhood of a symbol respectively using a noisy frame and a pre-filtered frame.

Denoising process 300 can define context $\eta(ns_{i,j,k})$ to be a set of symbols having specified relationships to the symbol $ns_{i,j,k}$. For example, context $\eta(ns_{i,j,k})$ can be a set of symbols that are from noisy frame $nf_k$ and have specific positions relative to the position i,j of symbol $ns_{i,j,k}$. An example of this type of neighborhood is illustrated in FIG. 4A, where context $\eta$ ($ns_{i,j,k}$) contains the eight closest neighboring symbols $ns_{i-1,j-1,k}$, $ns_{i,j-1,k}$, $ns_{i+1,j-1,k}$, $ns_{i-1,j,k}$, $ns_{i+1,j,k}$, $ns_{i-1,j+1,k}$, $ns_{i,j+1,k}$, and $ns_{i+1,j+1,k}$. Alternative denoising processes can use other definitions of context $\eta(ns_{i,j,k})$, for example, corresponding to sets containing more or fewer neighboring symbols in noisy frame $nf_k$.

In accordance with an aspect of the current invention, a context for a current symbol $ns_{i,j,k}$ in the current frame $nf_k$ can be defined to include values of one or more symbols/pixels from preceding or following frames. For example, conventional motion estimation techniques can be used to identify a symbol $ns_{i',j',k+1}$ in next frame $nf_{k+1}$ or a symbol $ns_{i'',j'',k-1}$ in the previous frame $nf_{k-1}$ that corresponds to the current symbol $ns_{i,j,k}$. The corresponding symbols in other frames would be expected to be similar to the current symbol $ns_{i,j,k}$ and are therefore particularly useful in identifying when the occurrence of the current symbol $ns_{i,j,k}$ in the current context $\eta$ ($ns_{i,j,k}$) is likely to be noise.

Figure 4B:
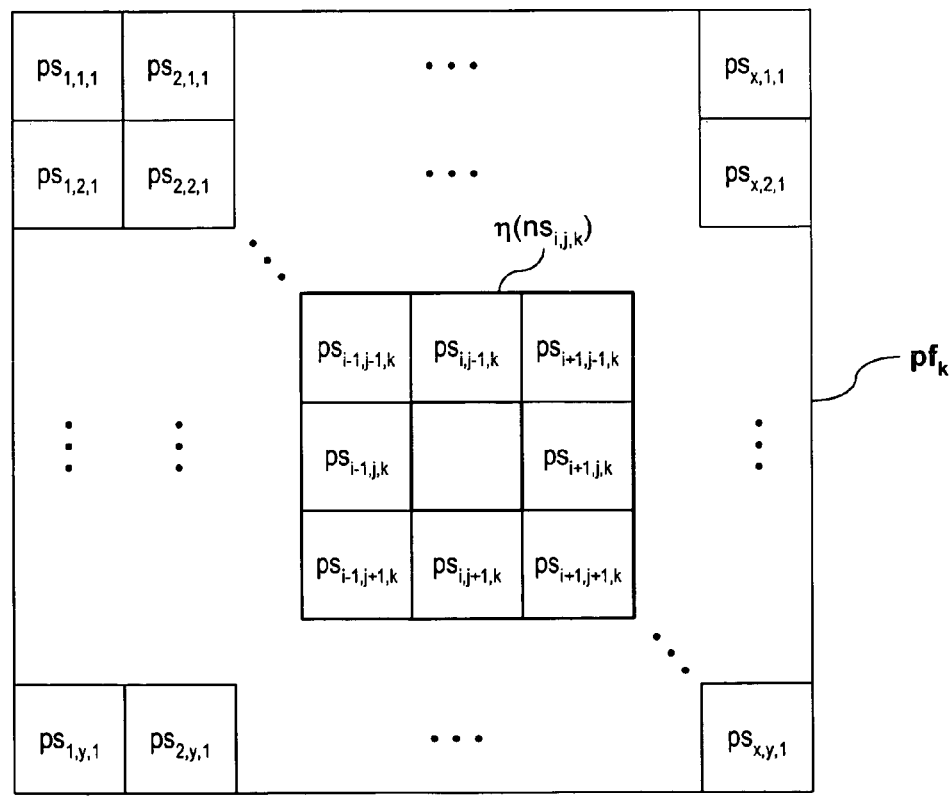

Another technique for defining the context of a symbol uses a pre-filtered frame. Using pre-filtered data for context definition can improve modeling performance because contexts defined using symbols of noisy frame $nf_k$ are themselves subject to noise, which may obscure the determination of the rarity of a symbol occurrence in particular contexts. To reduce this effect of noise, context $\eta(ns_{i,j,k})$ can be a defined set of symbols from a pre-filtered frame $pf_k$ as illustrated in FIG. 4B. In the example of FIG. 4B, context $\eta(ns_{i,j,k})$ contains eight symbols $ps_{i-1,j-1,k}$, $ps_{i,j-1,k}$, $ps_{i+1,j-1,k}$, $ps_{i-1,j,k}$, $ps_{i+1,j,k}$, $ps_{i-1,j+1,k}$, $ps_{i,j+1,k}$, and $ps_{i+1,j+1,k}$ closest to position i,j in pre-filtered frame $pf_k$. Use of pre-filtered or iteratively filtered data for context definition is further described in U.S. patent application Ser. No. 11/180,067, entitled "Context Identification using a Denoised Signal," which is hereby incorporated by reference in its entirety.

Motion pictures generally provide redundant information that can be used in the preliminary filtering or denoising process that produces pre-filtered frame $pf_k$. In particular, conventional motion estimation techniques can identify correlated pixel values in a set of noisy frames $nf_{k-b}$ to $nf_{k+c}$ of the current scene. For each pixel $ns_{i,j,k}$ in the current frame $nf_k$, pre-filtering can combine the correlated pixel values from other noisy frames $nf_{k-b}$ to $nf_{k+c}$ to generate the corresponding pixel value $ps_{i,j,k}$ in the pre-filtered frame. The process for combining the correlated pixel values from different frames can perform any filter operation. For example, the mean or the average of the correlated pixel values (with or without removing extreme pixel values) can produce the corresponding pixel value $ps_{i,j,k}$ of the pre-filtered frame $pf_k$. Noise will then have less effect on the context $\eta(ns_{i,j,k})$ determined from the pre-filtered frame $pf_k$.

Once the current context for the current symbol is identified, step 314 updates a count corresponding to the current symbol value and context. In one embodiment of the invention, the count updated is a component of a count vector $m_k(\eta)$ for the current frame $nf_k$ and the current context η, and the specific component incremented corresponds to the current symbol $ns_{i,j,k}$. This embodiment directly generates a set of raw count vectors $m_k$ for the current frame $nf_k$.

An alternative method for statistically characterizing the occurrence of symbols in contexts uses a priori knowledge of the nature of motion pictures so that each occurrence of a symbol may effectively cause an update in the counts for multiple contexts. One specific implementation of this principle employs context classes that identify sets of contexts that may be expected to have similar statistical behavior. For example, symbols representing natural images would be expected to have spatial correlation or "continuity" with symbols representing spatially adjacent points. This property suggests that symbols found in two contexts that have the same textural variation about different base symbol values will have similar relationships to the base values of their respective contexts. In such a case, a class count vector $M_k(C(\eta))$ can be produced that contains counts accumulated for all occurrences in current frame $nf_k$ of symbols having contexts $\eta$ that are in a context class $C(\eta)$, where the context class $C(\eta)$ contains all contexts having the same texture. Each occurrence in the current frame $nf_k$ of a symbol $a_i$ having a context $\eta$ contributes a count to a component of class count vector $M_k(C(\eta))$, and the component receiving the count corresponds to a value $a_i-\bar{\eta}$, where $\bar{\eta}$ is a base symbol for the context $\eta$. Base symbol $\bar{\eta}$ in general depends on context $\eta$ and may be, for example, the average or mean of the symbols making up context $\eta$. Each class count vector $M(C(\eta))$ in general will have more components than there are symbols in the alphabet because the components correspond to differences between two symbols. However, each class count vector $M(C(\eta))$ will generally have more counts than a direct count of count vectors $m(\eta)$ because each class count vector $M(C(\eta))$ combines counts from multiple count vectors $m(\eta)$.

Raw count vectors $m_k$ for the current frame can be determined from the corresponding class count vector $M(C(\eta))$ by shifting the coefficients of class count vector $M(C(\eta))$ by an index base value $\bar{\eta}$, and clamping the components with indices that are out of range for a count vector. Index base value $\bar{\eta}$ in general may be but is not required to be equal to the base symbol $\bar{\eta}$ for the context $\eta$. Methods and systems for improving the statistics in determining count vectors for denoising processes are generally described in more detail in U.S. patent application Ser. No. 11/180,066, entitled "Context-Based Denoiser that Simultaneously Updates Probabilities for Multiple Contexts," which is hereby incorporated by reference in its entirety.

Modeling scan 310 of FIG. 3 after updating a count for the current symbol in step 314 determines in decision step 315 whether there is another symbol to be scanned. If so, modeling pass 310 branches from step 315 to repeat step 312 to 314 to select the next symbol in the current frame, identify another context, and update a count for the occurrence of the current symbol having the identified context. If the current frame contains no further symbols to be scanned, modeling scan 310 goes from step 315 to 316. At this point, raw count vectors $m_k$ or raw class count vectors $M_k$ for the current frame $nf_k$ are available.

Decision step 316 of modeling scan 310 determines if there are any further frames in the current scene. As noted above, the end of the current scene can be identified from the degree of correlation between two successive frames. If the next frame is sufficiently correlated with the current frame, modeling pass jumps from step 316 back to step 311 and selects the next frame to be the new current frame. If the next frame is not in the current scene, modeling scan 310 has completed modeling of the current scene, and at this point raw count vectors $m_u$ to $m_v$ or raw class count vector $M_u$ to $M_v$ for noisy frames $nf_u$ to $nf_v$, where frame index values u and v correspond to the first and last frames in the scene, are available.

Replacement pass 320 for a scene includes steps 321 to 325 and uses the raw count vectors $m_u$ to $m_v$ or raw class count vector $M_u$ to $M_v$ for the scene to determine which symbols in the noisy frames $nf_u$ to $nf_v$ are replaced. Step 321 selects a current frame, which can initially be the first frame $nf_u$ of the scene, and step 322 selects a current symbol in the current frame. A current context for the current symbol is identified in step 323 using the same technique as used in step 313 described above.

Step 324 determines an enhanced count vector $\bar{m}_k(\eta)$ for the current context $\eta$ and current frame $nf_k$. Enhanced count vector $\bar{m}_k(\eta)$ contains contributions from the raw count vectors $m_u$ to $m_v$ or raw class count vectors $M_u$ to $M_v$ determined for the current scene. For example, if the raw count vectors $m_u$ to $m_v$ are available, enhanced count vector $\bar{m}_k(\eta)$ can be calculated using Equation 2, where u and v are the frame indices of the first and last frames $nf_u$ to $nf_v$ in the scene and $c_{i-k}$ are forgetting factors that have a maximum value for $i-k=0$ and decrease with $|i-k|$. Some of the forgetting factors $c_{i-k}$ may be zero, for example, if the scene extends of a long period of time and $|i-k|$ is too large.

$$\bar{m}_k(\eta) = \sum_{i=u}^{v} c_{i-k} m_i(\eta) \qquad \text{Equation 2}$$

Equation 2 can be used if class count vectors $M_u$ to $M_v$ are known and count vectors $m_u$ to $m_v$ are determined from class count vectors $M_u$ to $M_v$. Alternatively, if class count vectors $M_u$ to $M_v$ are known, an enhanced class count vector $\bar{M}_k(C(\eta))$ can be determined using Equation 3, and enhanced count vector $\bar{m}_k(\eta)$ can be determined from enhanced class count vector $\bar{M}_k(C(\eta))$ by shifting the components of enhanced class count vectors $\bar{M}_k(C(\eta))$ by $\bar{\eta}$ places and clamping the components with indices outside the range of the alphabet. In Equation 3, forgetting factors $c_{i-k}$ can have the same properties as described above in regard to Equation 2.

$$\bar{M}_k(C(\eta)) = \sum_{i=u}^{v} c_{i-k} M_i(C(\eta)) \qquad \text{Equation 3}$$

Replacement step 325 uses the enhanced count vectors $\bar{m}_k$ determined in the preceding step 324 to determine a replacement for the current symbol. For example, if the current symbol has value $a_j$ and the current context is $\eta$, then the current symbol is replaced with symbol value $a_i$, where symbol value $a_i$ minimizes the estimated distortion $\bar{D}(a_j,a_i,\eta)$ of Equation 4. Terms in Equation 4 have the same definition as provided above for Equation 1, except that enhanced count vector $\bar{m}_k$ is used in Equation 4. Replacement based on enhanced count vector $\bar{m}_k$ should improve denoising performance because enhanced count vectors $\bar{m}_k$ include information from multiple frames and provides better statistical reliability when compared to corresponding raw count vectors $m_k$. Other known and future techniques using count vectors $m_k$ in estimating the clean count vectors $q_k^T$ and distortion $\bar{D}(a_j,a_i,\eta)$ would similarly benefit from using enhanced count vectors $\bar{m}_k$ in place of raw count vectors $m_k$.

$$\bar{D}(a_j,a_i,\eta) = q_k^T(\eta)(\lambda(a_i) \odot \pi(a_j)) \approx \bar{m}_k^T(\eta) \Pi^{-1}(\lambda(a_i) \odot \pi(a_j)) \qquad \text{Equation 4:}$$

Decision step 326 determines whether there is another symbol in the current frame that is eligible for replacement. If so, replacement pass 320 jumps back to step 322 and selects the next symbol for potential replacement. After replacement pass 320 has processed the last symbol in the current frame, step 327 determines whether the next frame is in the current scene. If so, replacement pass 320 jumps from step 327 back to step 321 and selects the next frame as the current frame. Replacement decisions for the new current frame use a new set of enhanced count vectors that are calculated using Equation 3 above with the new value for the current frame index k. After the last frame in the current scene, replacement pass 320 is complete, and process 300 moves to step 330.

Step 330 determines if there is another scene to be denoised. If so, modeling scan 310 is restarted with the first current frame being in the new scene, and denoising process 300 then continues as described above. If no further scenes need to be denoised, process 300 is complete.

Although the invention has been described with reference to particular embodiments, the description is only an example of the invention's application and should not be taken as a limitation. For example, although the above embodiments employ particular step orders, the order in which steps or processes are executed can be altered. For example, all modeling can be performed on an entire motion picture before any replacement operations are performed. Additionally, well known techniques can be employed to reduce processing power. For example, calculations to determine quantities such as enhanced count vectors, need not be repeated in a denoising process if such quantities where previously determined and stored. Various other adaptations and combinations of features of the embodiments disclosed are within the scope of the invention as defined by the following claims.

What is claimed is:

1. A denoising process comprising:
    statistically processing a series of frames of a motion picture to construct respective data structures for the frames, each data structure indicating for each of a plurality of contexts, occurrences of symbols that have the context and are in the corresponding one of the frames;
    combining the data structures for multiple frames to construct a first enhanced data structure for a first of the frames; and
    replacing symbols in the first frame with values determined using the first enhanced data structure.

2. The process of claim 1, wherein statistically process the series of frames, comprises:
    (a) selecting a current frame from the series of frames;
    (b) selecting a current symbol in the current frame;
    (c) identifying a current context for the current symbol; and
    (d) updating a count that is in the data structure for the current frame to reflect occurrence of the current symbol in the current context.

3. The process of claim 2, further comprising repeating steps (b), (c), and (d) a plurality of times to sequentially select a plurality of the symbols in the current frame.

4. The process of claim 2, further comprising:
    repeating step (a) a plurality of times to select every frame from the series of frames as the current frame; and
    for each repetition of step (a), repeating steps (b), (c), and (d) a plurality of times to sequentially select a plurality of the symbols in the current frame.

5. The process of claim 2, wherein identifying the current context comprises setting the current context to be a set of symbols that are in the current frame and adjacent to the current symbol.

6. The process of claim 2, wherein identifying the current context comprises:
    identifying for each symbol in the current frame a set of correlated symbols in other frames of the series;
    constructing a pre-filtered frame containing symbols, wherein each of the symbols in the pre-filtered frame is a combination of the symbols in the set of correlated symbols corresponding to a symbol in a matching position in the current frame; and
    setting the current context to be a set of symbols that are in the pre-filtered frame and adjacent to the position matching the current symbol.

7. The process of claim 2, wherein identifying the current context comprises:
    applying motion estimation to identify a corresponding symbol that is in one of the frames of the series other than the current frame and corresponds to the current symbol; and
    including the corresponding symbol in the current context.

8. The process of claim 2, wherein updating a count comprises incrementing a component of a count vector that corresponds to the current context, wherein the component incremented corresponds to the current symbol.

9. The process of claim 2, wherein updating a count comprises incrementing a component of a class count vector that corresponds to a class of contexts that includes the current context, wherein the component incremented corresponds to a difference between the current symbol and a base value for the current context.

10. The process of claim 1, wherein combining the data structures for multiple frames to construct the first enhanced data structure comprises combining only the data structures for frames that are in a same scene as the current frame.

11. The process of claim 1, wherein combining the data structures for multiple frames to construct the first enhanced data structure comprises applying forgetting factors so that frames that are further from the current frame in the series contribute less to the first enhanced data structure.

12. A computer readable medium containing instructions that when executed perform the process of claim 1.

13. A denoising system comprising:
    a modeling unit capable of statistically processing a series of frames of a motion picture to construct respective data structures for the frames, each data structure indicating for each of a plurality of contexts, occurrences of symbols that have the context and are in the corresponding one of the frames; and
    a replacement unit communicatively coupled to the modeling unit, wherein the replacement unit operates to replace symbols in a first of the frames with values identified using a first enhanced data structure that is constructed for the first frame by combining the data structures for multiple frames.

14. The system of claim 13, wherein the modeling unit statistically processes the series of frames using a modeling process comprising:
    (a) selecting a current frame from the series of frames;
    (b) selecting a current symbol in the current frame;
    (c) identifying a current context for the current symbol; and
    (d) updating a count that is in the data structure for the current frame to reflect occurrence of the current symbol in the current context.

15. The system of claim 14, wherein the modeling process further comprises repeating steps (b), (c), and (d) a plurality of times to sequentially select a plurality of the symbols in the current frame.

16. The system of claim 14, wherein the modeling process further comprises:
    repeating step (a) a plurality of times to select every frame from the series of frames as the current frame; and
    for each repetition of step (a), repeating steps (b), (c), and (d) a plurality of times to sequentially select a plurality of the symbols in the current frame.

17. The system of claim 14, wherein in the modeling process, identifying the current context comprises setting the current context to be a set of symbols that are in the current frame and adjacent to the current symbol.

18. The system of claim 14, wherein in the modeling process, identifying the current context comprises:
   identifying for each symbol in the current frame a set of correlated symbols in other frames of the series;
   constructing a pre-filtered frame containing symbols, wherein each of the symbols in the pre-filtered frame is a combination of the symbols in the set of correlated symbols corresponding to a symbol in a matching position in the current frame; and
   setting the current context to be a set of symbols that are in the pre-filtered frame and adjacent to the position matching the current symbol.

19. The system of claim 14, wherein in the modeling process, identifying the current context comprises:
   applying motion estimation to identify a corresponding symbol that is in one of the frames of the series other than the current frame and corresponds to the current symbol; and
   including the corresponding symbol in the current context.

20. The system of claim 14, wherein in the modeling process, updating a count comprises incrementing a component of a count vector that corresponds to the current context, wherein the component incremented corresponds to the current symbol.

21. The system of claim 14, wherein in the modeling process, updating a count comprises incrementing a component of a class count vector that corresponds to a class of contexts that includes the current context, wherein the component incremented corresponds to the current symbol.

22. The system of claim 13, wherein combining the data structures for multiple frames to construct the first enhanced data structure comprises combining only the data structures for frames that are in a same scene as the current frame.

23. The system of claim 13, wherein combining the data structures for multiple frames to construct the first enhanced data structure comprises applying forgetting factors so that frames that are further from the current frame in the series contribute less to the first enhanced data structure.

* * * * *